(12) United States Patent
Lee et al.

(10) Patent No.: US 7,097,929 B2
(45) Date of Patent: Aug. 29, 2006

(54) MOLTEN CARBONATE FUEL CELL

(75) Inventors: Choong Gon Lee, Taejon (KR); Byoung Sam Kang, Taejon (KR); Hai Kung Seo, Taejon (KR); Hee Chun Lim, Taejon (KR)

(73) Assignee: Korea Electric Power Corporation, Seoul (KR)

( * ) Notice: Subject to any disclaimer, the term of this patent is extended or adjusted under 35 U.S.C. 154(b) by 456 days.

(21) Appl. No.: 10/270,582

(22) Filed: Oct. 16, 2002

(65) Prior Publication Data
US 2003/0072989 A1 Apr. 17, 2003

(30) Foreign Application Priority Data
Oct. 17, 2001 (KR) .......................... 2001-0064024

(51) Int. Cl.
*H01M 2/14* (2006.01)
(52) U.S. Cl. .................. 429/38; 429/39; 429/34; 429/35
(58) Field of Classification Search ................ 429/33, 429/34, 38, 39, 35
See application file for complete search history.

(56) References Cited

U.S. PATENT DOCUMENTS 4,708,916 A 11/1987 Ogawa et al. ............... 429/38

FOREIGN PATENT DOCUMENTS

| JP | 61-248364 | 11/1986 |
|----|-----------|---------|
| JP | 62-202465 | 9/1987  |

*Primary Examiner*—Bruce F. Bell
(74) *Attorney, Agent, or Firm*—Dykema Gossett PLLC

(57) ABSTRACT

Disclosed is a molten carbonate fuel cell capable of preventing the leakage of a fuel gas due to deterioration of material by suppressing a high temperature generated at a hot section within a unit cell, thereby improving the reliability thereof. The present invention provides a molten carbonate fuel cell including a plurality of stacked unit cells 8, and separator plates 3 interposed between the adjacent unit cells, the respective unit cells having porous fuel electrode plates 9a and 9b, air electrode plates 11a and 11b, and electrolyte plates 10 interposed between these electrode plates; wherein the separator plate 3 forming a body 1 of the unit cell 8 is provided with at a center thereof intake internal manifolds 12a and 13a arranged at regular intervals for taking in fuel gas R and oxidant gas O towards a center of the body, and at both sides thereof exhaust internal manifolds 12b, 12c, 13b and 13c for exhausting the reacted fuel gas R and the reacted oxidant gas O, as well as forming passages for the fuel gas R ad the oxidant gas O at both sides thereof.

5 Claims, 5 Drawing Sheets

MOLTEN CARBONATE FUEL CELL

BACKGROUND OF THE INVENTION

1. Field of the Invention

The present invention relates to a fuel cell using molten carbonate as an electrolyte, and more particularly, to a molten carbonate fuel cell capable of preventing the leakage of a fuel gas due to deterioration of material by suppressing a high temperature generated at a hot section within a unit cell, thereby improving the reliability thereof.

2. Background of the Prior Art

A fuel cell is a power generating apparatus for converting chemical energy into electrical energy using an electrochemical reaction, and is highlighted as a new electrical energy source, because of being an environmental friendly apparatus and having a high power-generating efficiency. Such a fuel cell has a characteristic of continuously generating the power by supplying a fuel through an oxidation reaction of hydrogen and a reduction reaction of oxygen in the air.

In particular, a molten carbonate fuel cell among fuel cells utilizes molten carbonate as an electrolyte, so that the operation is carried out at a high temperature of 650° C. and the speed of the electrochemical reaction is quick. Contrary to a low-temperature fuel cell, electrode reactions occur when the carbonate electrolyte is molten at a high temperature, thereby generating the power at a relatively high temperature. Since the oxidation-reduction reactions of hydrogen and oxygen do not require a catalyst made of noble metal such as expensive platinum, there are features of facilitating the utilization of a nontoxic gas, such as carbon monoxide, and a coal gas. Another feature is to anticipate a high thermal efficiency above about 80% due to the utilization of electricity and waste heat.

The molten carbonate fuel cell has porous anode/cathode electrodes having a wide surface area for facilitating the smooth procedure of the oxidation-reduction reactions of hydrogen and oxygen. The molten carbonate impregnated in a porous ceramic interposed between the porous anode/cathode electrodes functions as a shield of preventing direct contact between the fuel mainly made of hydrogen and the oxidant made of oxygen, and a passage for guiding carbonate ions ($CO_3^{2-}$) produced from an air electrode to a fuel electrode.

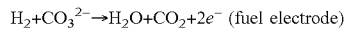

$H_2 + CO_3^{2-} \rightarrow H_2O + CO_2 + 2e^-$ (fuel electrode)

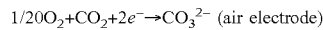

$1/2 O_2 + CO_2 + 2e^- \rightarrow CO_3^{2-}$ (air electrode)

However, since a unit cell forming one cell generates a low electromotive force of 1 V, it is no properly to be practically used. Such unit cells are stacked, with conductive separator plates interposed between two adjacent unit cells, to constitute the power generating system.

Specifically, the unit cell includes a pair of porous electrode plates (fuel electrode and air electrode), and an electrolyte plate consisting of alkali carbonate interposed between these electrode plates. These fuel cells are stacked one above another, and a conductive separator plate is interposed between two adjacent unit cells. The separator plate electrically connects these unit cells, and provides the fuel electrode with a passage of a fuel gas and the air electrode with a passage of an oxidant gas.

Such the fuel cell of stacked structure requires a manifold for distributing and collecting the reaction gas. The gas to be required for the reaction is supplied via an inlet manifold, and after passing through the air electrode and the fuel electrode, is outwardly discharged via a manifold opposed to the inlet manifold. Each unit cell is provided with a wet seal formed by molten carbonate, in order to prevent the fuel and the oxidant from being mixed within the fuel cell. The body of the fuel cell and the manifold are also wet-sealed together in order to prevent the reaction gases from leaking out.

In case of the fuel cell, however, a part of energy contained in the fuel is converted into the electrical energy, and the remainder is converted into the atmospheric heat. Accordingly, in case of the stacked fuel cell, the heating value is varied depending upon a degree of the stack. The more the fuel cells are stacked, the more the heating value is generated. Therefore, the hot section is produced at the outlet of the gas.

This high temperature has an influence on the components of the fuel cell, i.e., the electrodes, the electrolyte and the separator plates. Specifically, there are some situations: change of the porous structure, and evaporation of the liquid electrolyte, which are due to the high temperature; consumption of the electrolyte and deformation of the separator plates, which are due to the increased corrosion of the metal separator plate; and leakage of the fuel gas, due to these causes. Therefore, the lifetime of the fuel cell is significantly reduced.

In order to suppress the production of the hot section, a method is widely used to cool it by overly supplying the oxidant gas mainly comprising air. The oversupply of air at the defined passage provides the gas flow with a resistance, thereby causing the pressure to be increased.

The conventional molten carbonate fuel cell isolates the fuel from the oxidant gas by use of the electrolyte impregnated in the porous ceramic in a type of wet seal. However, since the oversupply of the oxidant for suppressing the production of the hot section causes the high pressure to be produced within the passage, the fuel gas is leaked out due to the rupture of the wet seal, thereby significantly shortening the life of the fuel cell body.

Another method is used to reduce the degree of the electrode reactions, i.e., lower the current density, so that the production of the hot section may be suppressed by use of the small heating value. However, the utilization of the lower current density causes the usage of the molten carbonate fuel cell to be highly limited as a power-generating plant having a high output.

One method employing internal and external manifolds in the fuel cell body is disclosed in Japanese Laid-Open Patent Publication No. 62-202465. Intake and exhaust of the fuel gas are distributed at its center by use of the internal manifold, and the fuel gas is exhausted by use of internal manifolds at both sides. The oxidant gas mainly used for cooling due to a lot amount of gases flows from one surface of the stacked fuel cell to the other opposed surface by use of the external manifold. When using a lot amount of oxidant gases in a long passage of oxidant gas, the leakage of the fuel gas due to the pressure generation is not evitable.

Another method, similar to the above-mentioned method, is disclosed in Japanese Laid-Open Patent Publication No. 61-248364. The fuel gas is supplied from internal manifolds provided at both sides of a separator plate, and is collected and exhausted to a center internal manifold, so that the fuel gas and the oxidant gas are perpendicularly crossed. Since the oxidant gas in charge of cooling the fuel cell body flows from one surface of the stacked fuel cell to the other opposed surface, it is difficult to supply a lot amount of oxidant gases using the pressure generated by means of the long passage.

SUMMARY OF THE INVENTION

Accordingly, the present invention is directed to a molten carbonate fuel cell that substantially obviates one or more problems due to limitations and disadvantages of the related art.

It is an object of the present invention to provide a molten carbonate fuel cell capable of preventing the leakage of a fuel gas due to deterioration of material by suppressing a high temperature generated at a hot section within a unit cell, thereby improving the reliability thereof.

In order to accomplish the above objects, the present invention provides a molten carbonate fuel cell including a plurality of stacked unit cells, and separator plates interposed between the adjacent unit cells, the respective unit cells having porous fuel electrode plates, air electrode plates, and electrolyte plates interposed between these electrode plates; wherein the separator plate forming a body of the unit cell is provided with at a center thereof intake internal manifolds arranged at regular intervals for taking in fuel gas and oxidant gas towards a center of the body, and at both sides thereof exhaust internal manifolds for exhausting the reacted fuel gas and the reacted oxidant gas, as well as forming passages for the fuel gas and the oxidant gas at both sides thereof.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Figure 1:
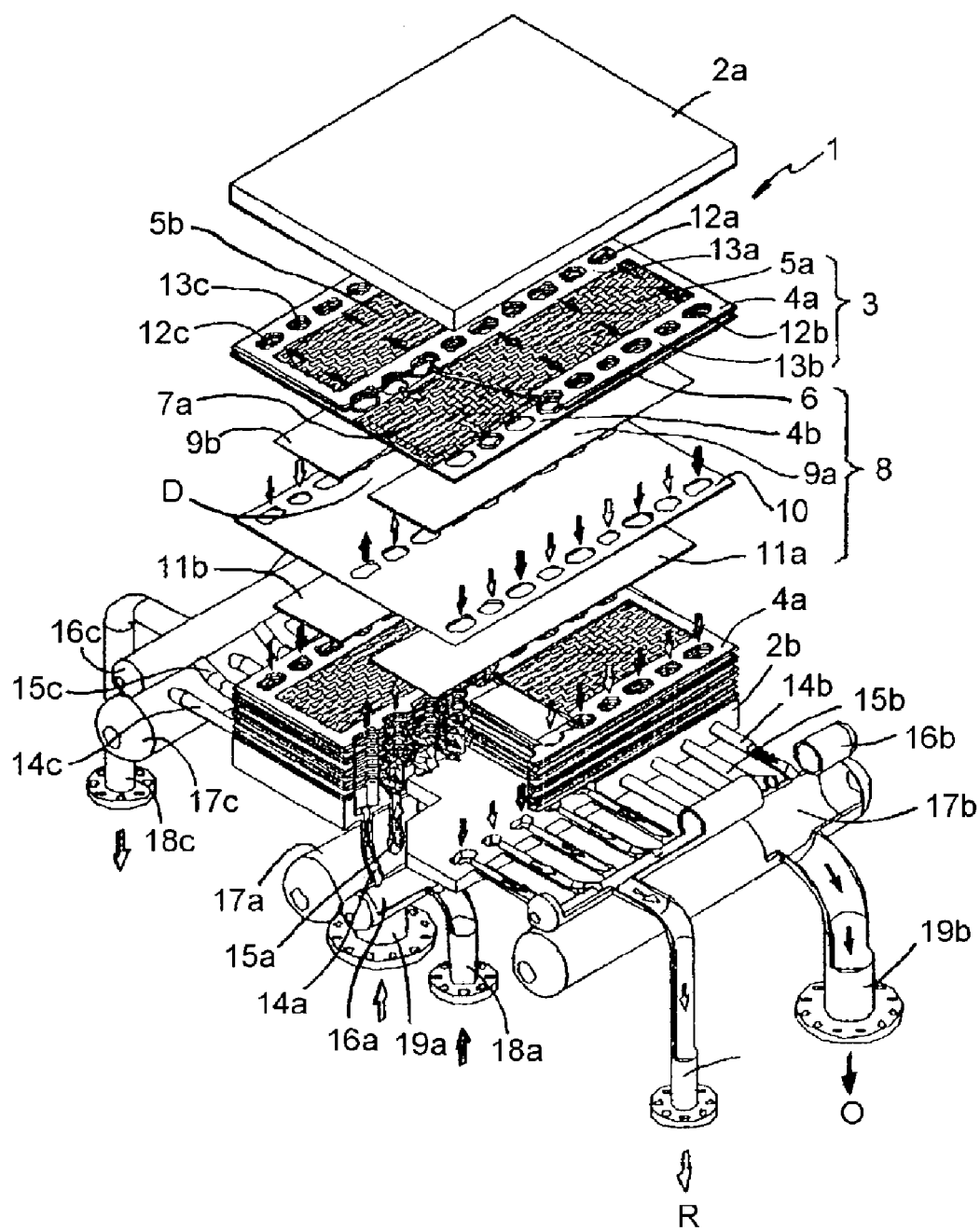
FIG. 1 is an exploded perspective view of a fuel cell according to one preferred embodiment of the present invention.

Reference will now be made in detail to a preferred embodiment of the present invention.

A fuel cell according to the present invention includes a plurality of stacked unit cells 8 and separator plates 3 interposed between adjacent unit cells, the respective unit cells having porous fuel electrode plates 9a and 9b, air electrode plates 11a and 11b, and electrolyte plates 10 interposed between these electrode plates. The separate plate 3 forming a body 1 of the unit cell 8 is provided with at a center thereof intake internal manifolds 12a and 13a arranged at regular intervals for taking in fuel gas R and oxidant has O towards a center of the body, and at both sides thereof exhaust internal manifolds 12b, 12c, 13b and 13c for exhausting the reacted fuel gas R and the reacted oxidant gas O, as well as forming passages for the fuel gas R and the oxidant gas O at both sides thereof.

As shown in FIG. 1, the body 1 of the fuel cell includes a plurality of stacked unit cells 8 each formed in the shape of a thin rectangular plate. Specifically, the body 1 of the fuel cell includes a plurality of stacked unit cells 8 between an upper end plate 2a and a lower end plate 2b, with the separator plate 3 interposed between adjacent unit cells. The unit cell 8 includes a pair of fuel electrode plates 9a and 9b made of porous nickel alloy, a pair of air electrode plates 11a and 11b made of porous nickel alloy, and the electrolyte plate 10 interposed between these electrode plates. The fuel electrode plates 9a and 9b and the air electrode plates 11a and 11b are split via a desired interval, respectively. The electrolyte plate 10 is made by impregnating the molten carbonate electrolyte, which is mixed with lithium carbonate or potassium carbonate, into a ceramic-based carrier such as lithium aluminate.

Figure 2:
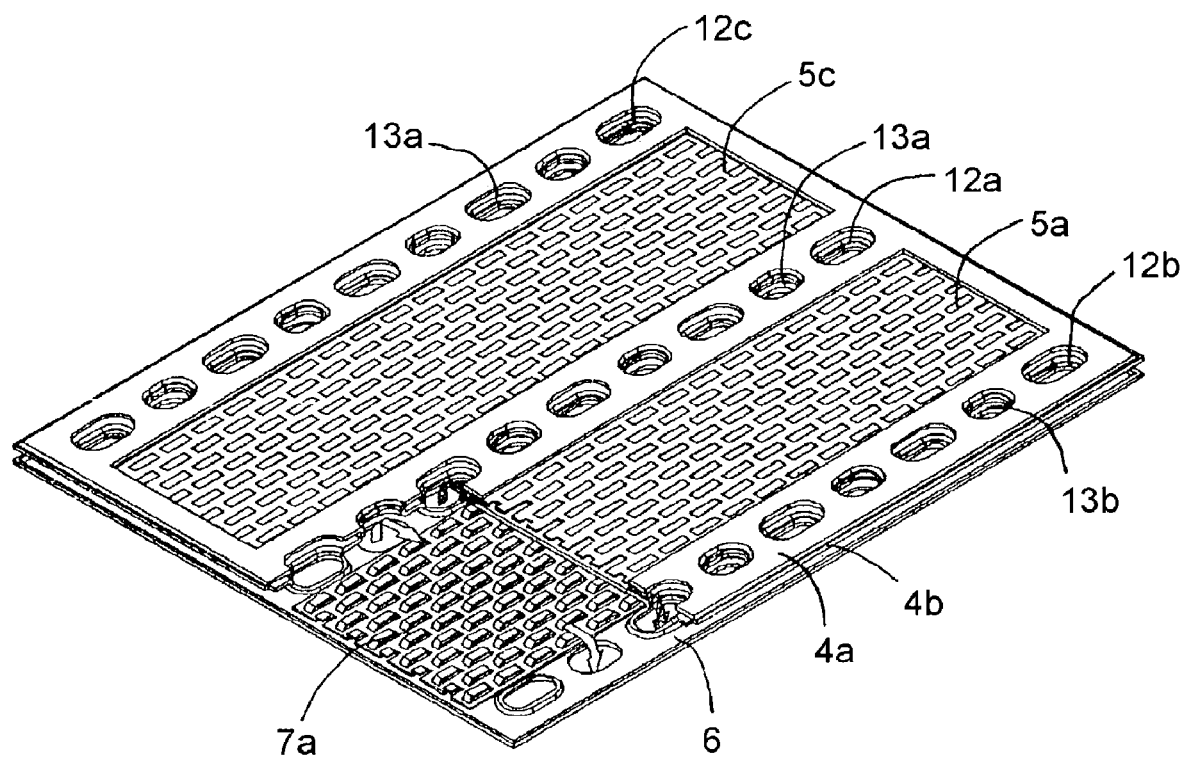
FIG. 2 is an exploded perspective view of a separator plate forming a fuel cell according to one preferred embodiment of the present invention.

As shown in FIG. 2, the separator plate 3 includes air electrode corrugated plates 5a and 5b, fuel electrode corrugated plates 7a and 7b, and a center plate 6 interposed between these plates, so that gases may flow between an air electrode mask plate 4a and a fuel electrode mask plate 4b. The air/fuel electrode mask plates 4a and 4b are portions directly contacted with the electrolyte plate 10, and, when the fuel cell normally operates, is exposed to the molten carbonate electrolyte. In order to prevent the corrosion of this exposed portion of the mask plates 4a and 4b, for example, a surface of stainless steel (STS316), which is directly contacted to the electrolyte plate 10, is subjected to surface treatment of corrosion resistance, such as aluminum surface treatment. The air electrode corrugated plates 5a and 5b are mainly made of stainless steel (STS316), while the fuel electrode corrugated plates 7a and 7b are mainly made of stainless steel (STS316) coated with nickel.

The separator plate 3 is provided with internal manifolds for taking in and exhausting the oxidant gas and fuel gas. Since the internal manifolds 12a, 12b and 12c for the oxidant gas are directly contacted to the center plate 6 and the mask plate 4b, only the oxidant gas used for air electrode gas passes through these internal manifolds 12a, 12b and 12c.

Meanwhile, since the internal manifolds 13a, 13b and 13c for the fuel gas are contacted to the center plate 6 and the air electrode mask plate 4a, only the fuel gas passes through these internal manifolds 13a, 13b and 13c. The center plate 6 and the anode mask plates 4a and 4b are joined at peripheral of the separator plate 3 to prevent the leakage of gases.

Figure 3:
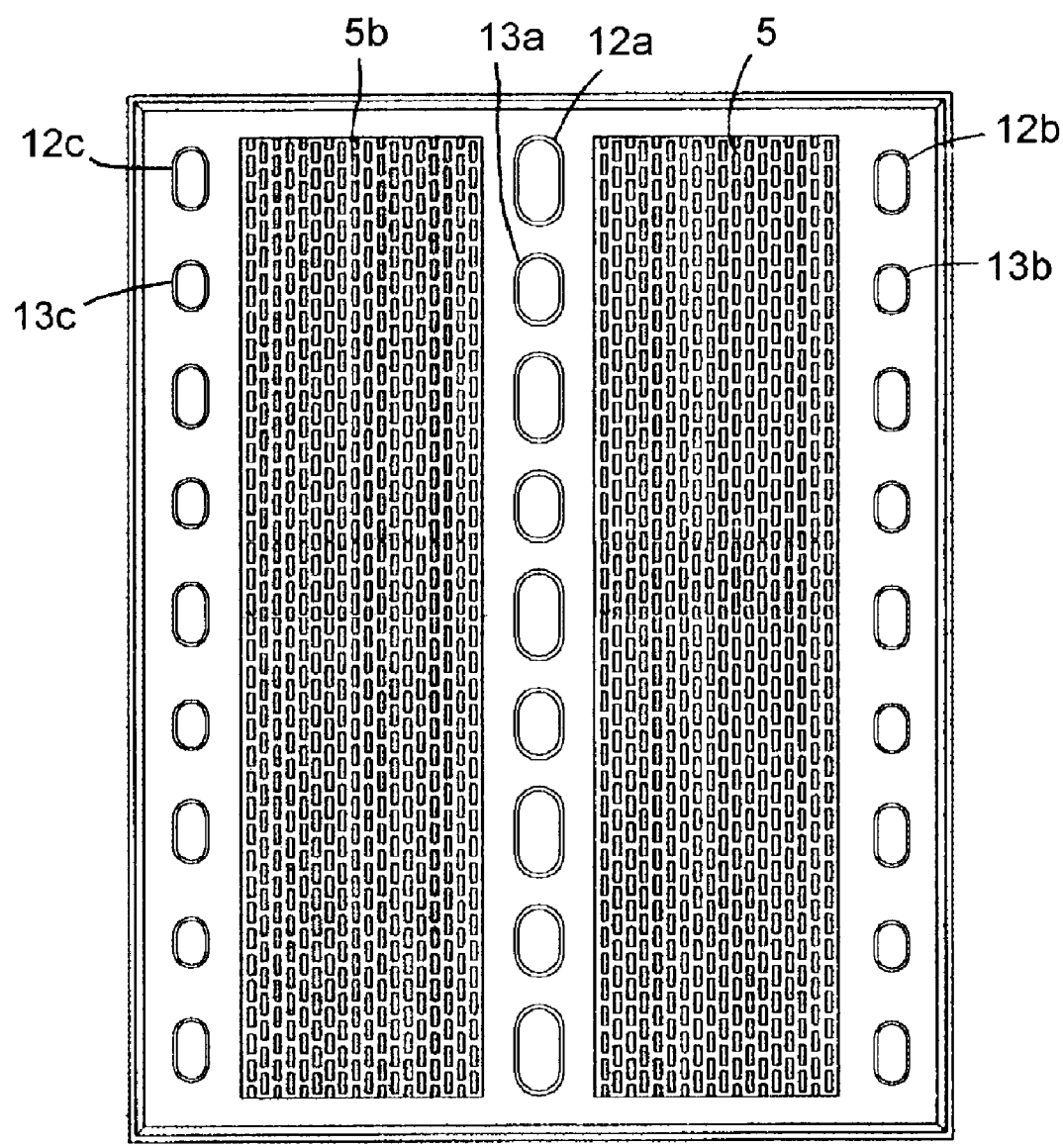
FIG. 3 is a top plan view of the separator plate shown in FIG. 2.

As will be known from FIG. 3, the fuel gas and the oxidant gas introduced to the unit cell through the center internal manifold 13a for the fuel gas and the internal manifold 12a for the oxidant gas take part in the electrochemical reaction required for the power generation at the electrode side, and then are exhausted through the respective exhaust internal manifolds 13b and 13c; 12b and 12c.

Because the introduced fuel gas and the oxidant gas are dispersed and exhausted to both sides, the respective exhaust internal manifolds 13b and 13c; 12b and 12c may be installed in such a manner that it is smaller than the intake internal manifolds 13a and 12a.

The end plate 2a positioned on the upper portion of the body 1 of the fuel cell is provided at its lower end with the fuel electrode mask plate 4b and the fuel electrode corrugated plates 7a and 7b, while the end plate 2b positioned under the lower portion thereof is provided at its upper end with the air electrode mask plate 4a and the air electrode corrugated plates 5a and 5b. The center portion of the lower end plate 2b is provided with the intake internal manifolds 12a and 13a and manifold connecting conduits 14a and 15a for taking in the fuel gas R and the oxidant gas O. The manifold connecting conduits 14a and 15a are connected to fuel gas intake manifold 16a and the oxidant gas intake manifold 17a, respectively, which are connected a fuel gas inlet 18a and an oxidant gas inlet 19a.

Explaining the operation of the present invention, if the fuel cell is heated up to a desired operating temperature, the electrolyte is molten to form the wet seal between the air electrode mask plate 4a, the fuel electrode mask plate 4b, and the electrolyte plate 10, thereby preventing the contact between the fuel gas R and the oxidant gas O. At that case, the electrochemical reaction occurs in the fuel electrode plates 9a and 9b and the air electrode plates 11a and 11b, so that the fuel cell generates the electrical energy.

Figure 4:
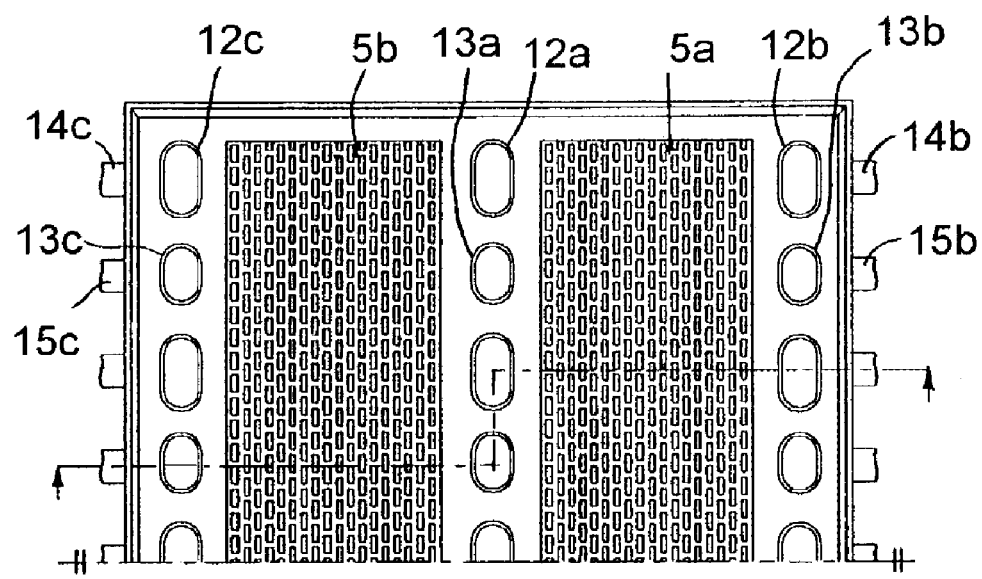
FIG. 4 is a partial top plan view of the fuel cell shown in FIG. 1, with an end plate being removed therefrom.
Figure 5:
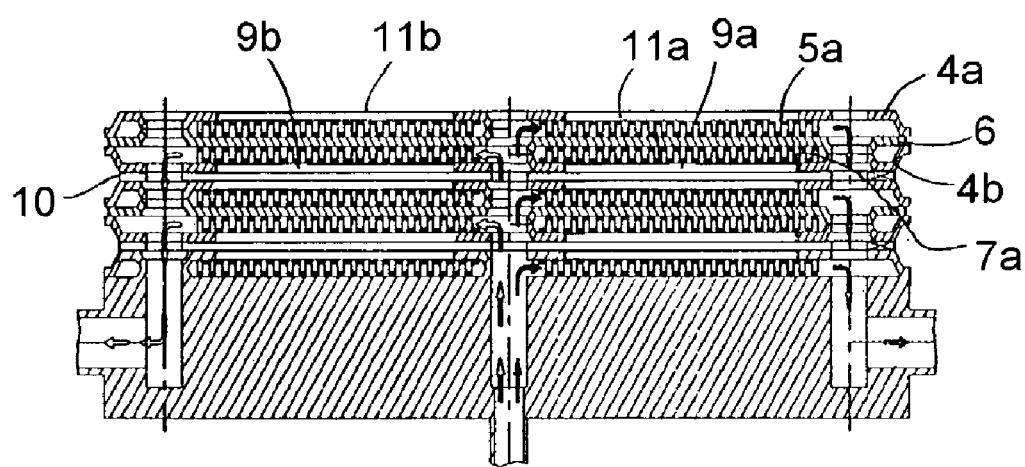
FIG. 5 is a cross sectional view taken along a line I—I of FIG. 4.

Specifically, as shown in FIG. 4, the fuel gas R and the oxidant gas O supplied the fuel/air gas intake manifold connecting conduits 15a and 14a are vertically distributed to each unit cell at the fuel gas intake internal manifold 13a and the oxidant gas intake internal manifold 12a, respectively. The respective distributed gases are horizontally moved to perform the reaction required for the power generation, and then are moved to the lower portion thereof through the fuel gas exhaust internal manifolds 13b and 13c and the oxidant gas discharge internal manifolds 12b and 12c. And then, the respective gases are discharged through the manifold connecting conduits 15b and 15c for the fuel gas and the manifold connecting conduits 14b and 14c for the oxidant gas, the fuel gas discharge manifolds 16b and 16c and the oxidant gas discharge manifolds 17b and 17c, and the fuel gas outlets 18b and 18c and the oxidant gas outlets 19b and 19c, in turns.

Figure 6:
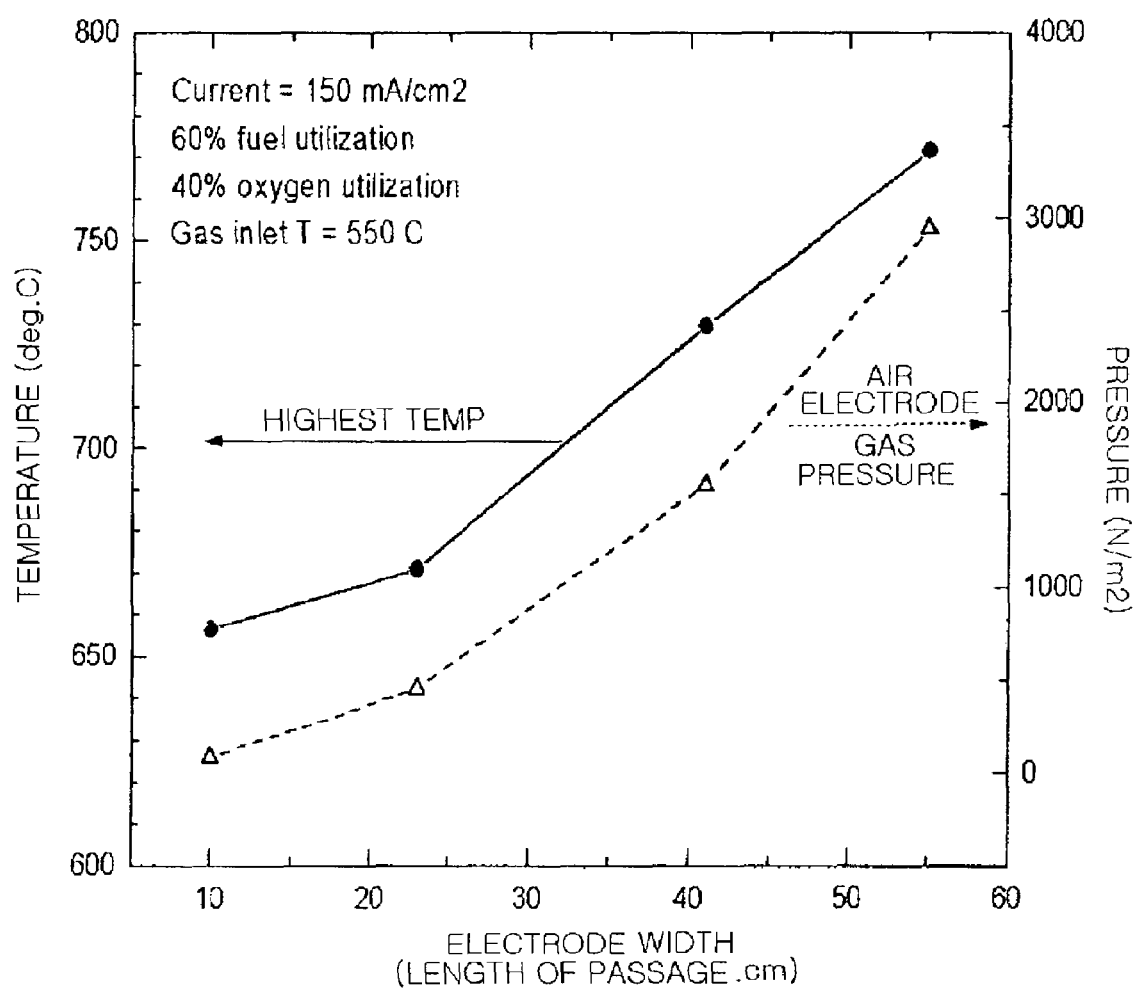
FIG. 6 is a graph showing the relationship between a discharging temperature and a pressure in accordance with an electrode width (length of passage) of a fuel cell of the present invention.

FIG. 6 is a graph showing the relationship between the pressure and the highest temperature generated at the cathode air electrode depending upon a width of the electrode (length of passage) under certain conditions. As will be known from the graph, the pressure is increased at the air electrode in accordance with the increased width of the electrode, and the highest temperature of the body is increased. In other words, the heating value is increased depending upon the increased width of the electrode, thereby no requiring the cooling.

It will be noted that the pressure generated at the air electrode is decreased in accordance with the reduced width of the electrode. Accordingly, by shortening the width of the electrode in half, the pressure generated at the air electrode is reduced, so that much more oxidant gases may be supplied, to suppress the generation of the high temperature at the hot section of the body.

With the construction, the present invention can prevent the leakage of a fuel gas due to deterioration of material by suppressing a high temperature generated at a hot section within a unit cell, thereby improving the reliability thereof.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A molten carbonate fuel cell including a plurality of stacked unit cells, and separator plates interposed between the adjacent unit cells, the respective unit cells having porous fuel electrode plates, air electrode plates, and electrolyte plates interposed between these electrode plates;

wherein the separator plate forming a body of the unit cell is provided with at a center thereof intake internal manifolds arranged at regular intervals for taking in fuel gas R and oxidant gas O towards a center of the body, and at both sides thereof exhaust internal manifolds for exhausting the reacted fuel gas R and the reacted oxidant gas O, as well as forming passages for the fuel gas R and the oxidant gas O at both sides thereof.

2. The molten carbonate fuel cell as claimed in claim 1, wherein the respective internal manifolds which are positioned at a center of the separator plate for taking in the fuel gas and the oxidant gas have larger cross-sectional areas than the exhaust internal manifolds.

3. The molten carbonate fuel cell as claimed in claim 1, wherein the internal manifolds for the oxidant gas are contacted to a center plate and a mask plate, so that only the oxidant gas used for air electrode gas passes through these internal manifolds.

4. The molten carbonate fuel cell as claimed in claim 1, wherein the internal manifolds for the fuel gas are contacted to the center plate and the air electrode mask plate, so that only the fuel gas passes through these internal manifolds.

5. The molten carbonate fuel cell as claimed in claim 3, wherein the center plate and the anode mask plates are joined at peripheral of the separator plate.

* * * * *